Oct. 23, 1934.  S. G. MILLER  1,978,216
AUTOMOBILE HAT RACK
Filed May 24, 1934
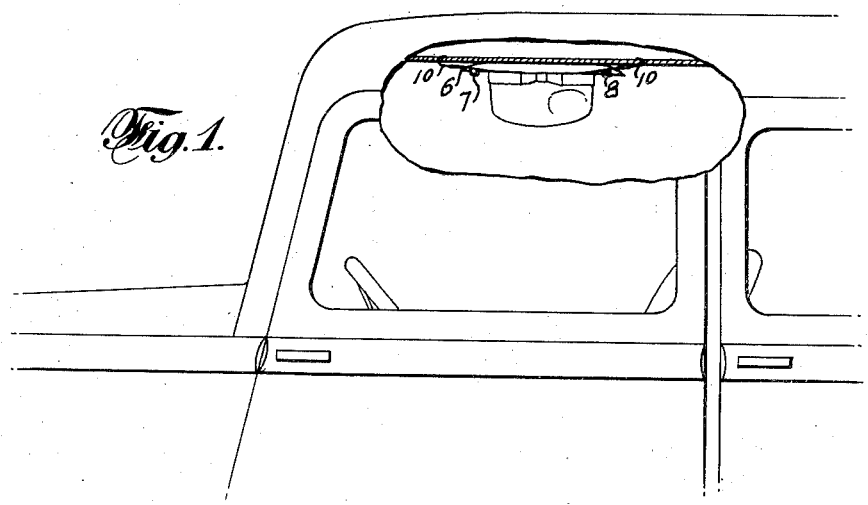
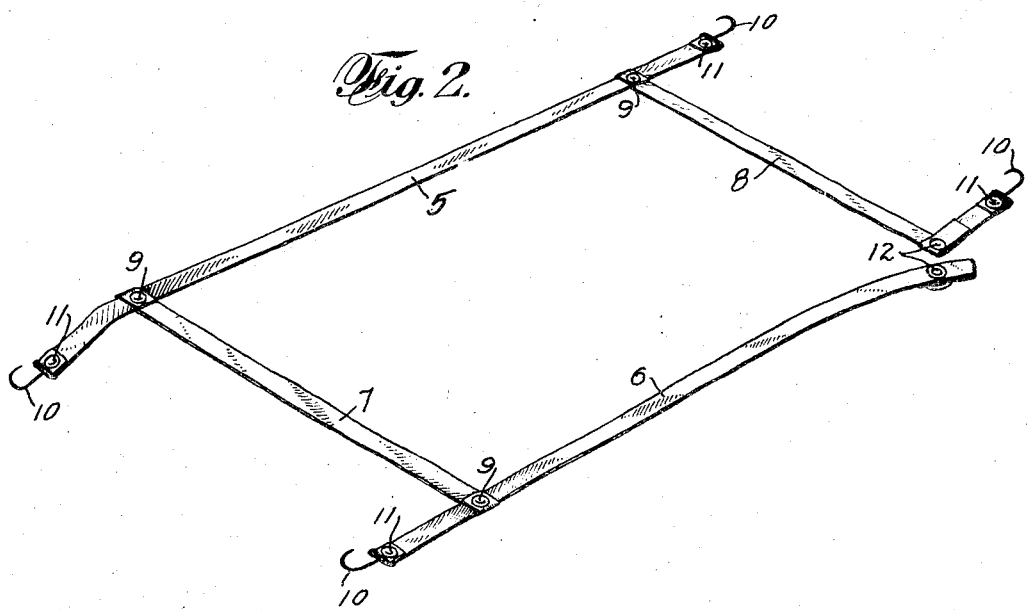
Samuel G. Miller INVENTOR
BY
ATTORNEYS.

Patented Oct. 23, 1934

1,978,216

UNITED STATES PATENT OFFICE 1,978,216

AUTOMOBILE HAT RACK

Samuel G. Miller, Brooklyn, N. Y.

Application May 24, 1934, Serial No. 727,260

2 Claims. (Cl. 211—31)

My invention relates to an automobile hat rack.

It is the principal object of the invention to provide a simple, inexpensive type of rack or holder for holding a hat in an automobile, preferably in the roof thereof, supported from the upholstery.

Another object is to provide a hat rack or holder which may be readily attached to and detached from the upholstery of an automobile and so constructed as to avoid injury to the upholstery.

And in general the object is to provide an improved, simple and useful means for holding a hat in an automobile.

Briefly stated, in a preferred form of the invention I provide a framework or hat sustaining portion, preferably formed by flexible members, such as tapes, cords or the like, so arranged that the crown of a hat may pass through the framework and the brim will be sustained or held thereon. The framework is detachably secured to the upholstery of the automobile, preferably by means of hooks, which are small and inconspicuous and of a character to avoid injury to the upholstery.

In the drawing which shows for illustrative purposes only, a preferred form of the invention—

Fig. 1 is a fragmentary conventional view of an automobile illustrating a rack and hat in place; and Fig. 2 is an isometric view of an automobile hat rack or holder illustrative of the invention.

In said drawing 5—6 indicate longitudinally extending members, made preferably of flexible material, such as fabric tape, cord or the like. 7—8 indicate transversely extending members, which may be of the same character as the longitudinally extending members 5—6 and, which are secured to the members 5—6 in any suitable manner, as by rivet devices 9.

The members 5—6, 7—8 form what may be termed a frame through which the crown of a hat may be passed and the brim of which will be sustained by opposed members of the frame. The frame is sustained from the upholstery of an automobile, preferably the upholstery of the roof, by suitable means, such as hooks 10, which are secured to part of the frame, such as the longitudinal tapes 5—6, by any suitable means, such as rivets or the like 11.

The hooks 10 are preferably made of relatively thin material and are quite sharp, so as to readily pierce the upholstery and yet not unduly mar the same. The frame is furthermore preferably of rather light material, so that the frame and supported hat will be insufficient in weight to unduly draw or otherwise mar the appearance of the upholstery of the automobile, either while the frame and hat are suspended therefrom or after the frame has been detached.

In order to facilitate placing the hat in the rack one or more of the tapes, such as the tape 6, may be made in two parts which are detachably secured together, as by means of a glove fastener device or the like 12.

When it is desired to support a hat, for example, from the roof of an automobile, the hooks are passed through the upholstery, for example, as indicated in Fig. 1, and the fastener device 12 may then be opened and the hat slid in edgewise, so as to cause the brim to pass between the roof of the car and the tape portions forming the framework. The parts of the tape 6 may then be fastened together again beneath the brim of the hat, and the latter will then be safely supported from the upholstery of the roof.

While the invention has been described in some detail and a single preferred form illustrated, it is to be understood that various changes and modifications may be made and the device may be formed of various materials, all within the scope of the invention as defined in the appended claims.

I claim:

1. In a device of the character indicated, hat supporting means comprising longitudinally extending tapes and transversely extending tapes secured to said longitudinally extending tapes and in spaced relation, whereby said tapes form an open frame to permit the crown of a hat to pass through and sustain the brim, and hook means carried by some of said tapes for engaging in and supporting the same and a hat from the upholstery of an automobile, said hook means comprising a hook of thin spring wire bent on a relatively long radius to permit said hook to spring when the tape attached thereto is pulled longitudinally.

2. In a device of the character indicated, a pair of longitudinally extending tapes, a pair of cross tapes in spaced relation to each other and connected to said longitudinally extending tapes, whereby a framework is formed to sustain the brim of a hat and permit the crown to pass through, hooks on some of said tapes to engage in and sustain the frame work from the upholstery of an automobile, and detachable fastening means between portions of at least one of said tapes to permit said framework to be opened for the insertion of a hat.

SAMUEL G. MILLER.